Sept. 15, 1970     R. L. RIENECKER     3,529,135
RATIO AND PROPORTION CALCULATOR
Filed Oct. 23, 1968     2 Sheets-Sheet 2
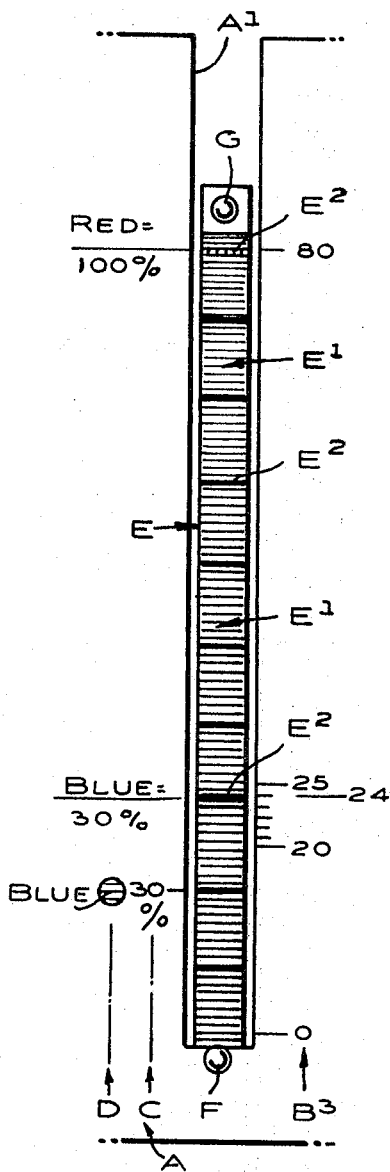
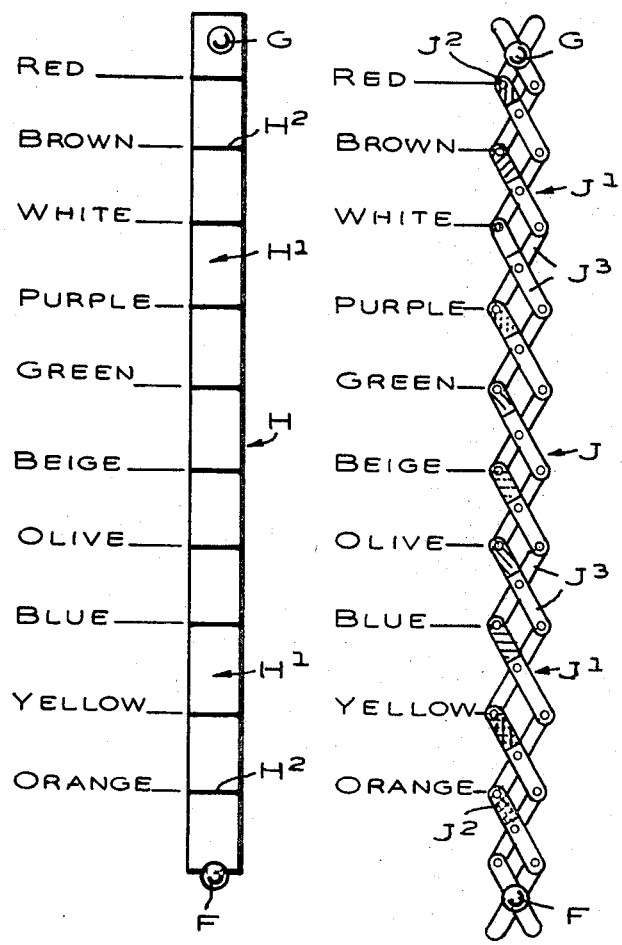
FIG. 6.
INVENTOR.
ROBERT L. RIENECKER
BY Joseph F. Cole
ATTORNEY

United States Patent Office 3,529,135
Patented Sept. 15, 1970

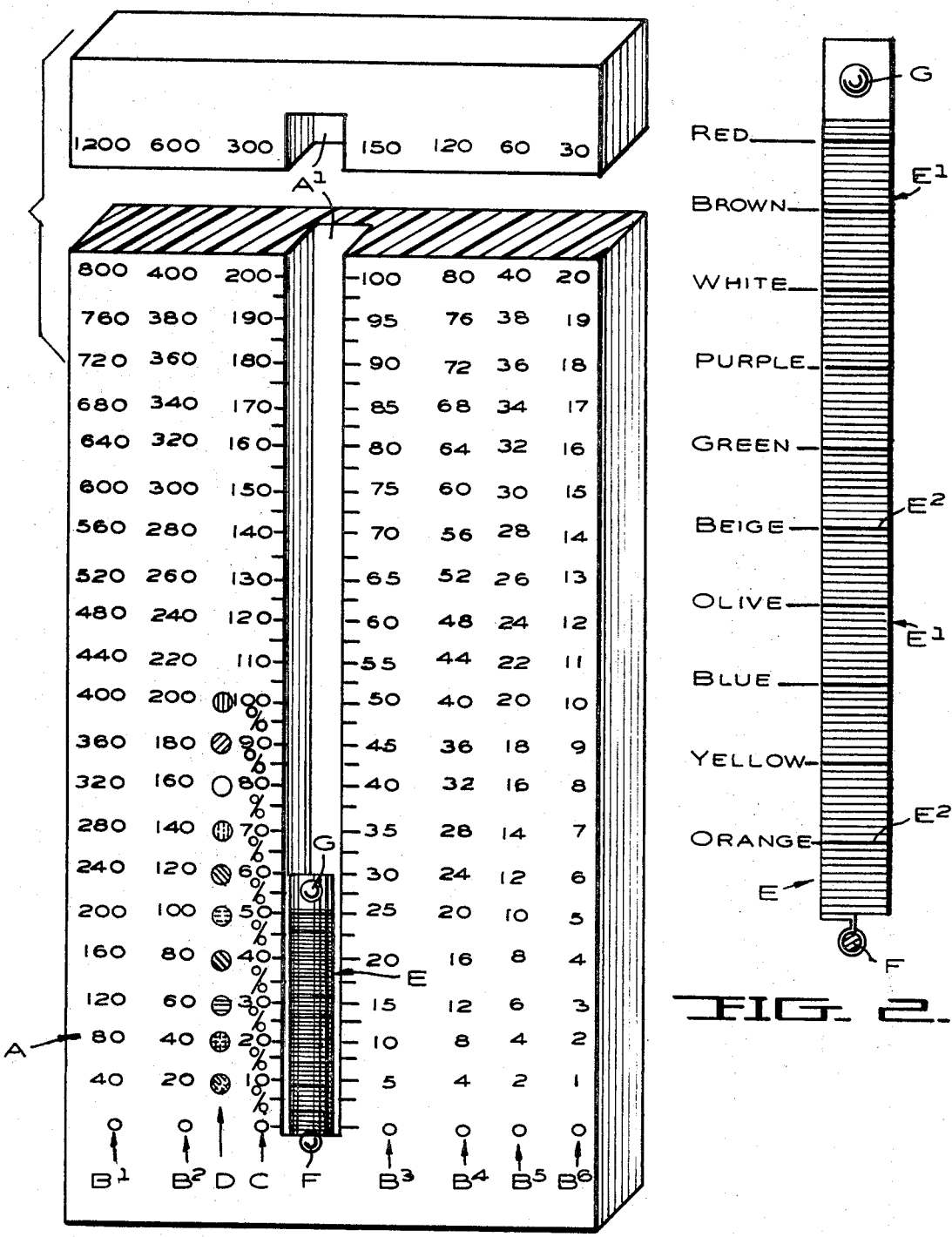

3,529,135
RATIO AND PROPORTION CALCULATOR
Robert L. Rienecker, 1524 Cabrillo Ave.,
Burlingame, Calif. 94010
Filed Oct. 23, 1968, Ser. No. 769,927
Int. Cl. G06c 27/00; G01d 13/02
U.S. Cl. 235—71      3 Claims

ABSTRACT OF THE DISCLOSURE

A ratio and proportion calculator having a base member which is provided with at least one numerical scale, a percentage scale and a column of distinctive symbols identifying each percentage graduation on the percentage scale. A stretchable element having corresponding distinctive indicia with the scales to provide a solution to a ratio or proportion problem.

SUMMARY

An object of this invention is to provide a relative simple and efficient calculator capable of solving percentage problems through ratio and proportion.

More particularly described, a base member is provided with at least one numerical scale displayed thereon in a column, with the numbers increasing in magnitude in one direction, and further having a percentage scale arranged in a column, with the percentage graduations increasing in magnitude in the same direction as the numbers on the numerical scale, each percentage graduation being identified by a distinctive symbol. A stretchable actuating element has one end thereof anchored to the base member, and this element being capable of being extended and contracted along the numerical scale, the actuating element being subdivided into components representing percentages of the length of the actuating element, and each component being identified by a distinctive indicia. All components of the actuating element are uniformly increased and decreased in length when the element is extended and contracted, respectively. The calculator may be used to solve percentage problems, ratio and proportion problems, in the shop, consumer mathematics and classroom mathematics, in manner hereinafter described in detail.

BRIEF DESCRIPTION OF THE DRAWINGS

For a better understanding of the invention, reference should be made to the accompanying drawings, forming part of this specification, in which:

FIG. 1 is an oblique view of my calculator for solving percentage problems through ratio and proportion, portions being broken away;

FIG. 2 is an enlarged elevational view of the stretchable actuating element;

FIG. 3 is a diagrammatic view illustrating the solving of three problems;

FIG. 4 is an elevational view of a modified actuating element made of rubber or elastic material;

FIG. 5 is an elevational view of a further embodiment of an actuating element consisting of a lazy tong arrangement; and FIG. 6 is a view of a series of tabs that may be used on the stretchable actuating element to indicate percentage components.

DESCRIPTION OF THE PREFERRED EMBODIMENTS

Referring to the first embodiment of my calculator for solving percentage problems through ratio and proportion, as shown in FIGS. 1 to 3, inclusive, a base member A has numerical scales $B^1$, $B^2$, $B^3$, $B^4$, $B^5$ and $B^6$ displayed thereon in columns, with the numbers increasing in magnitude from one end portion of the base member toward an opposite end portion thereof, as clearly shown in FIG. 1 of the drawings. Of course, the numerical scales may be increased or decreased to meet the requirements of the calculator, and this is obvious.

Moreover, the base member A has a percentage scale C thereon in a column, with the percentage graduations increasing in magnitude in the same direction as the numbers on the numerical scales. Each percentage graduation is identified by a distinctive symbol arranged in column D, and these symbols are distinguishable from one another.

Reading from the top of the symbol column D to the bottom thereof, these symbols have been hatched to show the following colors: 100%=red; 90%=brown;

80%=white

70%=purple; 60%=green; 50%= beige; 40%=olive; 30%=blue; 20%=yellow; and 10%=orange. These colors have been arbitrarily selected and may be changed.

It will be noted that a stretchable actuating element E has been disclosed in FIG. 1 as being disposed to extend generally lengthwise of the base member A in parallel relation with respect to the numerical columns $B^1$ to $B^6$, inclusive. One end of this actuating element is anchored to the base member A by a pin F, while the other end of this element is free and a knob G thereon may be grasped by an operator for extension and contraction of the actuating element. The latter is accommodated in slot $A^1$ in the base member A that parallels the numerical and percentage scales.

As illustrated in FIGS. 2 and 3, the actuating element E is subdivided into a plurality of components $E^1$ representing percentages of the length of the actuating member, it being observed that ten such components have been shown, and each is identified by a distinctive indicia, such as stripes of "red," "brown," "white," "purple," "green," "beige," "olive," "blue," "yellow" and "orange," as indicated by the legends in FIG. 2 of the drawings. When the actuating element E is provided by a tension spring, as in FIGS. 1, 2 and 3, each component $E^1$ may consist of ten coils, and thus there will be a total of one hundred coils in the operating part of the spring. The distinctive indicia for each component is designated at $E^2$ in FIGS. 2 and 3 of the drawings.

It will thus be apparent that each component $E^1$ on the actuating element E is identified by a distinctive indicia $E^2$ that corresponds with one of the distinctive symbols in column D on the base member A. All of the components $E^1$ will be uniformly increased and decreased in length when the actuating element is extended and contracted, respectively. This follows Hooke's Law: Stress (applied force) is proportional to strain (deformation) within the elastic limit.

The following three problems have been shown as being solved in FIG. 3, wherein the formula p (percent or part quantity), r (rate or what percent?) and B (base or whole quantity) underlies the solution:

Problem 1: 30% (r) of $80 (B)=? (p)

Using ratio and proportion, the problem may be written: p:80::30:100, or as p/80=30/100. Solving this problem by mathematics, the unknown (p) will be found to be —24—.

This problem may be solved with my calculator, as shown in FIG. 3, as follows: Since the "red" indicia $E^2$ has been selected to represent 100% on the actuating element E, the spring has been stretched by moving the knob G upwardly until the "red" indicia $E^2$ is aligned with "80" on the numerical scale $B^3$. As disclosed in FIGS.

1 and 3, 30 percent (p) is represented by "blue" on the symbols column D. Opposite the "blue" indicia E² in FIG. 3 of the stretched actuating element will be found the answer —24—. This answer appears on the mathematical scale B³.

Problem 2: $24 (p) is what percent (r) of $80 (B)?

Again using ratio and proportion, the problem may be expressed: 100:r::80:24, or as 100/r=80/24. Mathematically the unknown (r) will be found to be 30%.

In solving this problem by my calculator, as in FIG. 3, when the "red" indicia E² (100%) on the stretched actuating element E is aligned with "80" on the numerical scale B³, the numeral "24" on the B³ scale will be opposite the "blue" indicia E² on the actuating element E, and this will indicate that the answer to the unknown (r) is 30%.

Problem 3: $24 (p) is 30% (r) of ? (B)

Using ratio and proportion, the problem may be stated: 24:B::30:100, or as 24/B=30/100. By mathematics, the unknown (B) will be found to be $80.

When solving this problem with my calculator, as in FIG. 3, the "blue" indicia E² (30%) on the stretched actuating element E is placed opposite the numeral "24" on the scale B³, and the "red" indicia E² (100%) will indicate that the answer to the unknown (B) is $80.00.

The other mathematical scales B¹, B², B⁴, B⁵ and B⁶ all contain different rows of numbers, and may be used one at a time in the same manner as column B³ previously mentioned.

Referring now to FIG. 4 of the drawings, the stretchable actuating element H is provided by a resilient strip of rubber or elastic material, and it may be substituted for the coil spring E in FIG. 1. The element H has been subdivided into ten components H¹, and each is designated by legends to show distinctive colored indicia H². The operation of this element in solving mathematical problems will be the same as that previously explained.

In FIG. 5, the stretchable actuating element J is provided by a lazy tong arrangement, and it may be substituted for the coil spring E in FIG. 1. This element J has been subdivided into ten components J¹, and each is provided with distinctive indicia J², and the latter has been colored the same as in FIGS. 2 and 4. The lazy tong arrangement is made up of jointed bars J³, and its operation will be the same as that previously described in connection with FIGS. 1, 2 and 3.

In FIG. 6, a plurality of tabs K have been shown as the distinctive indicia that may be used on the actuating elements mentioned earlier. Ten such tabs are illustrated, and they display the numbers "10" ... "100" to indicate percentages.

I claim:
1. In a calculator for solving percentage problems through ratio and proportion:
 (a) a base member having at least one numerical scale displayed thereon in a column, with the numbers increasing in magnitude from one end portion of the base member toward an opposite end portion thereof;
 (b) the base member further having a percentage scale arranged thereon in a column, with the percentage graduations increasing in magnitude in the same direction as the numbers on the numerical scale, and a column of distinctive symbols identifying each of said percentage graduations, each of said symbols being distinguished from one another;
 (c) a stretchable actuating element disposed to extend generally lengthwise of the base member and having one end thereof anchored to the base member, the other end of the actuating element being free and adapted to be grasped by an operator for extension and contraction of the actuating element;
 (d) the actuating element being subdivided into a plurality of components representing percentages of the length of the actuating element, each component being identified by a distinctive indicia corresponding with one of the distinctive symbols on the base member;
 (e) all of the components of the actuating element being uniformly increased and decreased in length when the actuating element is extended and contracted, respectively.

2. The calculator for solving percentage problems through ratio and proportion, as set forth in claim 1;
 (f) and in which the symbols on the base member and the indicia on the actuating element are colored, the color of the symbol for a particular percentage on the percentage scale being the same as the color of the corresponding percentage indicia on the actuating element.

3. In a calculator for solving percentage problems through ratio and proportion:
 (a) a base member having at least one numerical scale displayed thereon in a column, with the numbers increasing in magnitude from one end portioin of the base member toward an opposite end portion thereof;
 (b) the base member further having a percentage scale arranged thereon in a column, with the percentage graduations increasing in magnitude in the same direction as the numbers on the numerical scale and a column of distinctive symbols identifying each of said percentage graduations;
 (c) a stretchable actuating element disposed between said numerical scale and said percentage scale and extending generally lengthwise of the base member and having one end thereof anchored to the base member, the other end of the actuating element being free and adapted to be grasped by an operator for extension and contraction of the actuating element;
 (d) the actuating element being subdivided into a plurality of components representing percentages of the length of the actuating element, each component being identified by a distinctive indicia;
 (e) all of the components of the actuating element being uniformly increased and decreased in length when the actuating element is extended and contracted, respectively.

References Cited
UNITED STATES PATENTS

| | | | |
|---|---|---|---|
| 357,361 | 2/1887 | Benham | 235—61 X |
| 398,851 | 3/1889 | Schulze-Berge | 33—19 |
| 683,379 | 9/1901 | Byron | 235—61 |
| 1,429,785 | 9/1922 | Smith | 235—61 |
| 2,256,116 | 9/1941 | Hughes | 235—69 |
| 2,530,955 | 11/1950 | Gerber | 235—61 |
| 3,330,478 | 7/1967 | Berry | 235—61 |

RICHARD B. WILKINSON, Primary Examiner

S. A. WAL, Assistant Examiner

U.S. Cl. X.R.

116—135; 235—125